(12) United States Patent
Awad (10) Patent No.: US 12,302,221 B2
(45) Date of Patent: *May 13, 2025

(54) COMMUNICATION SYSTEM FOR COMMUNICATING MINIMUM SYSTEM INFORMATION

(71) Applicant: NEC Corporation, Tokyo (JP)

(72) Inventor: Yassin Aden Awad, Tokyo (JP)

(73) Assignee: NEC CORPORATION, Tokyo (JP)

( * ) Notice: Subject to any disclaimer, the term of this patent is extended or adjusted under 35 U.S.C. 154(b) by 0 days.

This patent is subject to a terminal disclaimer.

(21) Appl. No.: 18/733,970

(22) Filed: Jun. 5, 2024

(65) Prior Publication Data

US 2024/0323813 A1 Sep. 26, 2024

Related U.S. Application Data

(63) Continuation of application No. 18/211,937, filed on Jun. 20, 2023, now Pat. No. 12,096,341, which is a
(Continued)

(30) Foreign Application Priority Data

Jun. 16, 2017 (GB) .................................. 1709679

(51) Int. Cl.
*H04W 4/00* (2018.01)
*H04W 48/10* (2009.01)
(Continued)

(52) U.S. Cl.
CPC ........... *H04W 48/10* (2013.01); *H04W 48/16* (2013.01); *H04W 72/30* (2023.01)

(58) Field of Classification Search
CPC ..... H04W 48/10; H04W 48/16; H04W 72/30; H04W 48/20; H04W 74/006; H04L 5/0007; H04L 5/0044; H04L 5/0053
(Continued)

(56) References Cited

U.S. PATENT DOCUMENTS

| 2013/0155874 A1 | 6/2013 | Papasakellariou .... H04L 1/0029 370/328 |
| 2013/0155974 A1* | 6/2013 | Papasakellariou .... H04L 1/0029 370/328 |

(Continued)

FOREIGN PATENT DOCUMENTS

| CN | 106538012 A | 3/2017 |
| CN | 108141331 A | 6/2018 |

(Continued)

OTHER PUBLICATIONS

CN Office Action for CN Application No. 202211233620.0, mailed on Jul. 15, 2024 with English Translation.
(Continued)

*Primary Examiner* — Marcos Batista
(74) *Attorney, Agent, or Firm* — Sughrue Mion, PLLC (57) ABSTRACT

A communication system is disclosed in which minimum system information associated with a cell of a radio access network (RAN) is transmitted by a base station. The minimum system information comprises parameters for accessing a cell of the base station, divided into an initial part and a remaining part of the minimum system information. The base station transmits the initial part of the system information via a broadcast channel using a first set of communication resources; transmits information identifying an allocation of at least one further communication resource in a shared channel; and transmits the remaining part of the minimum system information using the at least one further communication resource identified by the allocation.

7 Claims, 8 Drawing Sheets

Related U.S. Application Data continuation of application No. 17/391,235, filed on Aug. 2, 2021, now Pat. No. 11,729,703, which is a continuation of application No. 16/622,067, filed as application No. PCT/JP2018/022570 on Jun. 13, 2018, now Pat. No. 11,122,498.

(51) Int. Cl.
  *H04W 48/16* (2009.01)
  *H04W 72/30* (2023.01)

(58) Field of Classification Search
  USPC .......................................... 455/434; 370/338
  See application file for complete search history.

(56) References Cited

U.S. PATENT DOCUMENTS

| | | | |
|---|---|---|---|
| 2014/0016598 | A1 | 1/2014 | Kwon et al. |
| 2015/0215825 | A1 | 7/2015 | Kim et al. |
| 2015/0289237 | A1 | 10/2015 | Kim et al. |
| 2016/0269872 | A1 | 9/2016 | Kim et al. |
| 2017/0099670 | A1 | 4/2017 | Bhattacharya et al. |
| 2017/0237584 | A1* | 8/2017 | Yan .................... H04L 27/2613 370/330 |
| 2017/0353255 | A1 | 12/2017 | Islam et al. |
| 2018/0184410 | A1 | 6/2018 | John Wilson et al. |
| 2018/0192383 | A1 | 7/2018 | Nam et al. |
| 2018/0323922 | A1* | 11/2018 | Lindoff ............. H04W 72/0453 |

FOREIGN PATENT DOCUMENTS

| | | |
|---|---|---|
| EP | 2384041 A1 | 11/2011 |
| EP | 2919402 B1 | 5/2017 |
| WO | 2014/148861 A2 | 9/2014 |
| WO | 2016/121308 A1 | 8/2016 |
| WO | 2016/200230 A1 | 12/2016 |
| WO | 2018187242 A1 | 10/2018 |

OTHER PUBLICATIONS

CATT, "NR PBCH and NR physical channel carried system information", 3GPP TSG RAN WG1 AH_NR Meeting R1-1700182, Jan. 10, 2017, pp. 1-p. 5.
"NR-PRCH design", 3GPP TSG RAN WG1 #88bis, R1-1705321, Spokane, USA, Apr. 3-7, 2017, pp. 1-8 (8 pages total).
Communication dated Nov. 4, 2020, from the Japanese Patent Office in Application No. 2019-569507.
NEC, "PRB indexing for RMSI in NR", 3GPP TSG RAN WG1 NR Ad-Hoc #2, R1-1710244, Qingdao, P.R. China, Jun. 27-30, 2017, pp. 1-5 (5 pages total).
NTT DOCOMO, Inc., "Further views on wider bandwidth operations for NR", 3GPP TSG RAN WG1 Meeting #89, R1-1708494, Hangzhou, P.R. China, May 15-19, 2017, pp. 1-6 (6 pages total).
Panasonic, "On default bandwidth part", 3GPP TSG RAN WG1 Ad-Hoc #2, R1-1710787, Qingdao, P.R. China, Jun. 27-30, 2017, pp. 1-5 (5 pages total).
Samsung, "Remaining issues of NR-PBCH", 3GPP TSG RAN WG1 #89, R1-1709180, Hangzhou, P.R. China, May 15-19, 2017, pp. 1-9 (9 pages total).
Communication dated Oct. 1, 2020 from the European Patent Office in application No. 18737733.8.
"3rd Generation Partnership Project; Technical Specification Group Radio Access Network; Study on New Radio Access Technology Physical Layer Aspects (Release 14)", 3GPP TR 38.802 V14.0.0, Mar. 2017, pp. 1-144.
"3rd Generation Partnership Project; Technical Specification Group Services and System Aspects; Study on Architecture for Next Generation System (Release 14)" 3GPP TR 23.799 V14.0.0, Dec. 2016, pp. 1-522.
British Search Report for 1709679.3 dated Oct. 31, 2017.
Intel Corporation, "Delivery of Remaining Minimum System Information", 3GPP TSG RAN WG1 Meeting RAN1 #88bis, R1-1704712, Apr. 3-7, 2017, pp. 1-3, Spokane, WA.
Intel Corporation, "Details on NR PBHC design", 3GPP TSG RAN WG1 Meeting RAN1 #89, R1-1707339, May 15-19, 2017, pp. 1-8, Hangzhou, P.R. China.
Intel Corporation, "NR PBCH Design", 3GPP TSG RAN WG1 Meeting RAN1 #88bis, R1-1704711, Apr. 3-7, 2017, pp. 1-7, Spokane, WA.
Intel Corporation, "Remaining system information delivery mechanisms", 3GPP TSG RAN WG1 Meeting RAN1 #69, R1-1707340, May 15-19, 2017 pp. 1-4, Hangzhou, P.R. China.
International Search Report for PCT/JP2018/022570 dated, Sep. 10, 2018 (PCT/ISA/210).
Written Opinion of the International Searching Authority for PCT/JP2018/022570 dated, Sep. 10, 2018.
Indian Office Action for IN Application No. 202017001326 mailed on Mar. 23, 2021.
EP Office Action for EP Application No. EP18737733.8 mailed on Jul. 21, 2021.
Sony, "Discussion on SS block time index indication", 3GPP Draft, TSG RAN WG1 Meeting #89, R1-1708253, May 15-19, 2017, P.R. China.
European Office Action for EP Application No. 18737733.8 mailed on Apr. 22, 2022.
ITL, On NR PBCH Design, 3GPP Draft, 3GPP TSG RAN WG1 Meeting #88bis, R1-1705793 NR-PBCH, Apr. 3-7, 2017.
CN Office Action for CN Application No. 202211233642.7, mailed on Apr. 22, 2024 with English Translation.
Kai Xiu, "GPP Oriented Design and Optimization of LTE Cell Search and Downlink Synchronization", Chinese Master's Theses Full-text Database, Mar. 5, 2013, pp. 1-pp. 58.
Jing-Lan Mo et al, "Minimum Correlation Decision Reduct in Inconsistent Target Information Systems Based on Dominance Relation", 2012 Fourth International Conference on Multimedia Information Networking and Security, Jan. 10, 2013, pp. 445-pp. 448.
Chinese Office Communication for CN Application No. 202211233620.0 mailed on Nov. 28, 2024 with English Translation.

\* cited by examiner

COMMUNICATION SYSTEM FOR COMMUNICATING MINIMUM SYSTEM INFORMATION

CROSS REFERENCE TO RELATED APPLICATIONS

This application is a continuation of U.S. patent application Ser. No. 18/211,937, filed Jun. 20, 2023, which is a continuation of U.S. patent application Ser. No. 17/391,235, filed Aug. 2, 2021, which issued as U.S. Pat. No. 11,729,703, which is a continuation of U.S. patent application Ser. No. 16/622,067, filed Dec. 12, 2019, which issued as U.S. Pat. No. 11,122,498, which is a National Stage of International Application No. PCT/JP2018/022570, filed Jun. 13, 2018, claiming priority based on United Kingdom Patent Application No. 1709679.3, filed Jun. 16, 2017, the disclosures of which are incorporated in their entirety herein by reference.

TECHNICAL FIELD

The present invention relates to the provision of system resources in a cellular or wireless telecommunications network, and particularly but not exclusively to indexing of physical resource blocks and resource block groups for component carriers (cells) that can be broken down into a number of smaller component carriers. The invention has particular but not exclusive relevance to wireless telecommunications networks implemented according to various standards defined by the 3rd Generation Partnership Project (3GPP). For example, the invention has relevance to Long Term Evolution (LTE) networks, LTE Advanced (LTE-A) networks, related enhancements to and developments of LTE/LTE-A, and to the more recent development of communication technologies beyond LTE/LTE-A into the so-called '5G', 'new radio' (NR), or 'NextGen' technologies.

BACKGROUND ART

Cellular communication networks generally comprise one or more radio access networks (RANs) that provide items of user equipment (UEs), in at least one discrete geographic region (a cell) covered by the RAN, with access to the communication network to allow the UEs to communicate with one another and to receive (or provide) one or more communication services to one another. The RAN typically comprises a base station which is configured to communicate with the UEs in an associated cell over an air-interface and with communication entities (or 'functions') in a core network (usually over a wired interface) in order to facilitate the set up and maintenance of communication sessions for individual UEs (e.g. for voice/video calls, data services etc.).

The terms '5G' and 'new radio' (NR) refer to an evolving communication technology that is expected to support a variety of applications and services such as Machine Type Communications (MTC), Internet of Things (IoT) communications, vehicular communications and autonomous cars (V2V/V2X), high resolution video streaming, smart city services, and/or the like.

3GPP technical report (TR) 23.799 V14.0.0 describes a possible architecture and general procedures for NextGen (5G) systems planned for Release 14 of the 3GPP standards. 3GPP also studied the potential use of frequency bands up to 100 GHz for new (5G) radio access networks, with a maximum channel bandwidth of 400 MHz per NR carrier in Rel-15. Directional beamforming and massive antenna technologies may also be used in order to overcome the severe channel attenuation characteristics associated with certain high frequency bands (e.g. mmWave bands). The term 'massive antenna' refers to an antenna having a high number of antenna elements (e.g. 100 or more) arranged in an array. Effectively, such a massive antenna may be used to communicate with several users at the same time, thus facilitating multi-user multiple-input and multiple-output (MU-MIMO) transmissions.

Whilst a base station of a 5G/NR communication system is commonly referred to as a New Radio Base Station ('NR-BS') or as a 'gNB' it will be appreciated that they may be referred to using the term, eNB (or 5G/NR eNB) which is more typically associated with LTE base stations. In case of MU-MIMO, a base station may also be referred to as a transmission and reception point (TRP). The term 'base station' will be used herein to refer generally to an NR-BS, gNB, eNB, TRP, or any equivalent communication device of a RAN.

One of the tasks of the base station is the provision of key information required by UEs to communicate in the cellular communication system, access particular services, and move as seamlessly as possible between cells of the same and different radio access technologies (RATs). This information is known as 'system information' and includes, amongst other information, minimum system information to allow the UE to access a cell and perform cell selection/re-selection (including information related to intra-frequency, inter-frequency and inter-RAT cell selections) and other system information that the UE may require in a cell in some circumstances (i.e. in addition to the minimum system information required to access the cell), for example to access specific services.

Elements of system information are typically grouped into a number of dedicated system information blocks, depending on the type of information. The blocks include a Master Information Block (MIB) comprising static, generally cell specific information that carries a part of the so-called minimum system information, the so-called 'RMSI' block which contains any remaining minimum system information (RMSI), and a number of additional system information blocks (SIBs) representing information that may be different for different UEs (or groups of UEs) which can be delivered via on-demand request. The MIB contains, for example, at least a part of the System Frame Number (SFN), timing information within the radio frame (e.g. SS block time index, half radio frame timing), RMSI scheduling information, reserved bits for future use, and a Cyclic Redundancy Check (CRC) value. The MIB is broadcast on the Physical Broadcast Channel (PBCH), while the RMSI and any on-demand SIBs are sent on the Physical Downlink Shared Channel (PDSCH) through Radio Resource Control (RRC) messages.

3GPP intends to provide one or more TRPs per new radio (NR) base station (i.e. 5G base station, or gNB) and each base station may support up to 1000 cells. The expected NR control structure has been presented in 3GPP TR 38.802 V14.0.0, the contents of which are incorporated herein by reference. This technical report describes, amongst others, the provision of synchronization signal and downlink broadcast signal/channels (section 6.2.3.1) in order to support initial access by the UEs (e.g. to a particular cell of the RAN) and mobility.

In summary, the synchronization signal used in NR is based on the cyclic-prefix (CP) orthogonal frequency-division multiplexing (OFDM) waveform. 3GPP defined a primary synchronisation signal (NR-PSS) and a secondary synchronisation signal (NR-SSS) for NR. NR-PSS is used at least for initial symbol boundary synchronization to the NR cell, and NR-SSS is used for detection of the NR cell identifier (or at least a part of it). NR-SSS detection is based on the fixed time/frequency relationship with NR-PSS resource position at least within a given frequency range and CP overhead.

At least one broadcast channel (NR-PBCH) is defined for NR. NR-PBCH is a non-scheduled broadcast channel carrying at least a part of the so-called minimum system information with fixed payload size and periodicity depending on carrier frequency range. Decoding of the NR-PBCH is based on the fixed relationship with NR-PSS and/or NR-SSS resource position.

For initial access, the UE can assume a signal corresponding to a specific, predetermined subcarrier spacing of NR-PSS/SSS in a given frequency band (which is known to the UE, e.g. factory configured). NR-PSS uses one antenna port. For NR-PBCH transmission, a single fixed number of antenna port(s) is supported. The UE assumes the predefined numerologies for NR-PBCH and NR-SS in a particular frequency range (hence no blind detection of the NR-PBCH transmission is required by the UE). At least a part of the minimum system information (e.g. MIB) is transmitted in the NR-PBCH. NR-PBCH contents include at least a part of the SFN, and an associated CRC value. The RMSI is transmitted via the NR-PDSCH.

There are ongoing discussions in the 3GPP RAN1 work group about scenarios where the overall network channel bandwidth (a gNB's system bandwidth) can be broken down into a number of smaller component carriers (CCs), which may have an effect on the way system information, and specifically, RMSI is provided.

The following is a summary of some of the agreements reached by 3GPP RAN1:

- A component carrier (cell) may simultaneously be operated with a number of different bandwidths (e.g. for different items of user equipment). For example, a gNB can operate simultaneously as a wideband CC for some UEs and as a set of intra-band contiguous CCs for other UEs. The intra-band contiguous CCs may also be used with carrier aggregation (CA) in order to dynamically increase the bandwidth (i.e. by aggregating multiple intra-band contiguous CCs) for some UEs when needed. It is preferred to allow zero (or a minimal) guardband between intra-band CCs within a wideband CC. In case a (non-zero) guardband is provided between two intra-band CCs, it is preferable to minimise the number of subcarriers used for the guardband.
- Single and multiple synchronisation signal locations are allowed in the wideband CC.
- For single-carrier operation, the UE is not required to receive any downlink signals outside the frequency range configured for that UE. However, an interruption time is needed, during which no signals are transmitted to the UE, in order to allow for changing (or moving) the frequency range if appropriate (e.g. from frequency range 'A' to frequency range 'B'). In this case, the frequency ranges may have different BWs and/or centre frequencies.
- One or multiple bandwidth part configurations for each component carrier can be semi-statically signalled to the UE (e.g. in RRC connected mode). Each bandwidth part consists of a group of contiguous Physical Resource Blocks (PRBs). However, reserved (or non-useable) resources can be configured within the bandwidth parts. The bandwidth of a bandwidth part equals to or is smaller than the maximal bandwidth capability supported by a UE. The bandwidth of a bandwidth part is at least as large as the bandwidth of the synchronisation signal block. However, it is not necessary that all bandwidth parts contain a synchronisation signal block.
- Configuration of a bandwidth part may include the following properties: a specific numerology (sub-carrier spacing, CP type), a frequency location (e.g. a centre frequency), a bandwidth (e.g. number of PRBs) for that bandwidth part.
- Each UE should expect at least one downlink (DL) bandwidth part and one uplink (UL) bandwidth part being active among the set of configured bandwidth parts for a given time instant. A UE is only assumed to receive/transmit within its active DL/UL bandwidth part(s) using the associated numerology. At least the Physical Downlink Shared Channel (PDSCH) and/or Physical Downlink Control Channel (PDCCH) are used for DL, and the Physical Uplink Control Channel (PUCCH) and/or Physical Uplink Shared Channel (PUSCH) are used for UL.
- The active DL/UL bandwidth part is not assumed to span a frequency range larger than the DL/UL bandwidth capability of the UE in a component carrier. Moreover, an appropriate mechanism needs to be specified for UE radio frequency (RF) retuning for bandwidth part switching.
- The same PRB grid structure for a given numerology is assumed to apply for narrow band UEs, CA UEs, and wideband UEs within a wideband NR carrier.

SUMMARY OF INVENTION

Technical Problem

The inventors realised that the above agreements have an impact on the current design of reference signals and also the current Resource Block Group (RBG) design and CSI subbands. It is also not currently agreed how to achieve a suitable PRB indexing that takes into account the above agreements.

The present invention seeks to provide a communication system and associated apparatus and methods for meeting or at least partially addressing the above issues. Specifically, the present document provides details of some of the ways in which the remaining issues of supporting wider network channel bandwidth (i.e. gNB's system bandwidth) may be achieved in NR systems, and more specifically, how to determine the PRB and RBG indexing in scenarios where the network channel bandwidth can comprise a number of smaller component carriers.

Solution to Problem

In one aspect, the invention provides a method performed by communication apparatus of a radio access network (RAN) of a telecommunication system, the method comprising: controlling transmission of minimum system information comprising minimum parameters required by a user equipment (UE) to access a cell of the telecommunication system, wherein the minimum system information comprises at least an initial part comprising part of said minimum system information and a remaining part comprising a remaining part of the minimum system information; transmitting at least the initial part of the system information via a physical broadcast channel (PBCH) using a first set of at least one communication resource; transmitting information identifying an allocation of at least one further communication resource; and transmitting at least the remaining part of the minimum system information using the at least one further communication resource identified by the allocation.

In another aspect, the invention provides a method performed by a communication device for obtaining minimum system information comprising minimum parameters required to access a cell of a radio access network (RAN) of the telecommunication system, wherein the minimum system information comprises at least an initial part comprising part of said minimum system information and a remaining part comprising a remaining part of the minimum system information, the method comprising: receiving at least the initial part of the system information via a physical broadcast channel (PBCH) using a first set of at least one communication resource; receiving information identifying an allocation of at least one further communication resource; and receiving at least the remaining part of the minimum system information using the at least one further communication resource identified by the allocation.

In another aspect, the invention provides a method performed by communication apparatus of a radio access network (RAN) of a telecommunication system, the method comprising: transmitting minimum system information comprising minimum parameters required by a user equipment (UE) to access a cell of the telecommunication system, wherein the minimum system information comprises at least an initial part comprising part of said minimum system information and a remaining part comprising a remaining part of the minimum system information; wherein the minimum system information comprises information identifying the location, within a network channel bandwidth of the cell, of at least one of: a physical broadcast channel (PBCH); and the RMSI.

In yet another aspect, the invention provides a method performed by a communication device of a radio access network (RAN) of a telecommunication system, the method comprising: receiving minimum system information comprising minimum parameters required to access a cell of the telecommunication system, wherein the minimum system information comprises at least an initial part comprising part of said minimum system information and a remaining part comprising a remaining part of the minimum system information; wherein the minimum system information comprises information identifying the location, within a network channel bandwidth of the cell, of at least one of: a physical broadcast channel (PBCH); and the RMSI.

Aspects of the invention extend to associated apparatus and computer program products such as computer readable storage media having instructions stored thereon which are operable to program a programmable processor to carry out a method as described in the aspects and possibilities set out above or recited in the claims and/or to program a suitably adapted computer to provide the apparatus recited in any of the claims.

Each feature disclosed in this specification (which term includes the claims) and/or shown in the drawings may be incorporated in the invention independently (or in combination with) with any other disclosed and/or illustrated features. In particular but without limitation the features of any of the claims dependent from a particular independent claim may be introduced into that independent claim in any combination or individually.

Whilst specific hardware apparatus having a specific physical structure (e.g. controllers and transceiver circuitry) have been disclosed for performing the various procedures described herein, each step of the methods disclosed in the description and/or forming part of the claims, may be implemented by any suitable means for performing that step. In accordance with this each method aspect of the invention has a corresponding apparatus aspect comprising respective means for performing each step of that method aspect.

Example embodiments of the invention will now be described by way of example only with reference to the attached figures in which:

DESCRIPTION OF EMBODIMENTS

Overview

Figure 1:
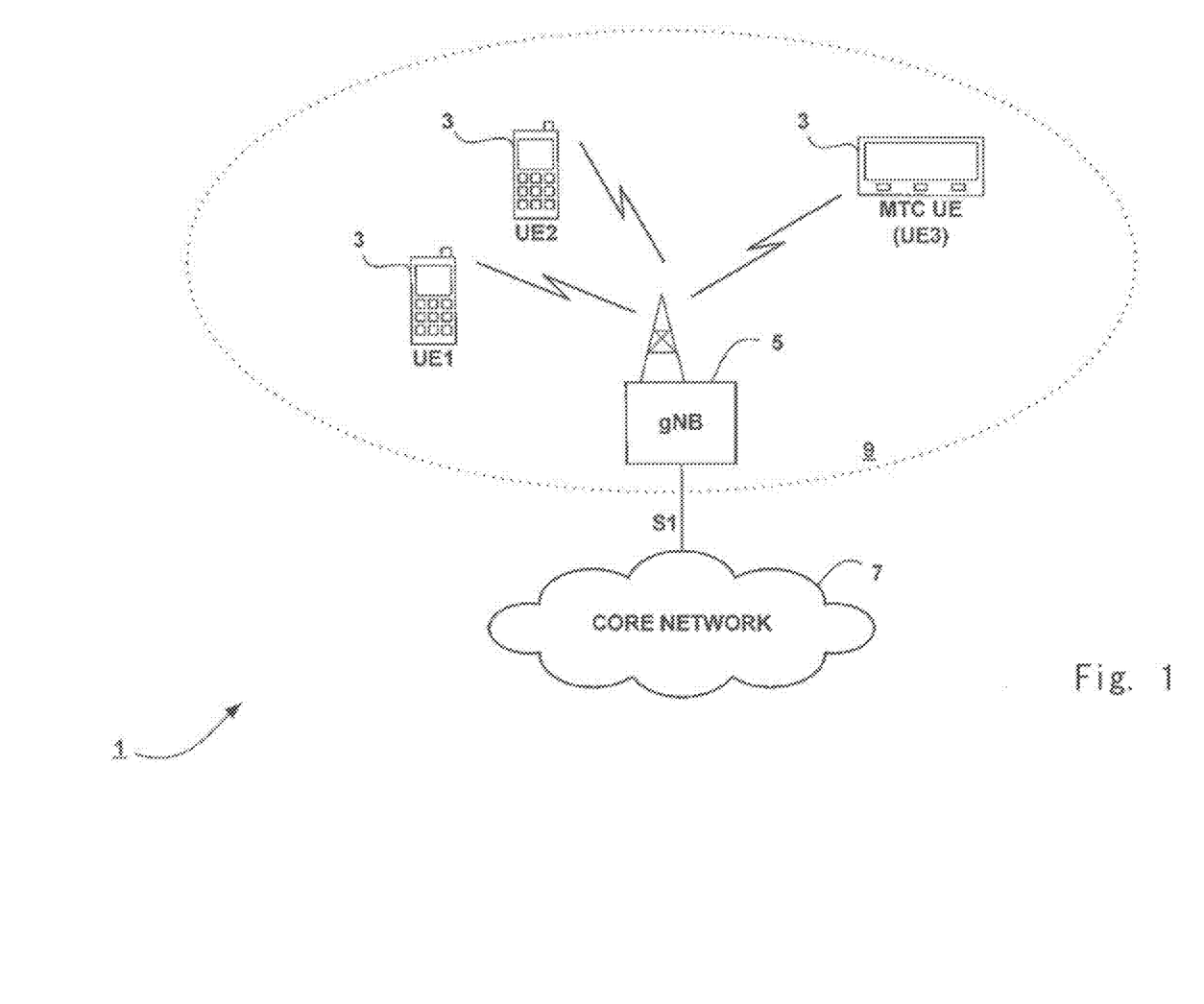
FIG. 1 schematically illustrates a cellular telecommunication system of a type to which the invention is applicable.

FIG. 1 schematically illustrates a cellular telecommunications system 1 in which a number of items of user equipment (UEs) 3 such as mobile telephones, and other fixed or mobile communication devices (e.g. MTC devices, IoT devices) can communicate with each other via a base station 5 and a core network 7 using an appropriate radio access technology (RAT). As those skilled in the art will appreciate, whilst two mobile devices 3 (denoted 'UE1' and 'UE2'), one MTC device 3 (denoted 'UE3'), and one base station 5 are shown in FIG. 1 for illustration purposes, the system, when implemented, will typically include other base stations and UEs.

The base station 5 forms part of a RAN and operates one or more associated cell 9 via which the UEs 3 can connect to the cellular telecommunications system 1. The UEs 3 may connect in the cell 9 by establishing a radio resource control (RRC) connection with the base station 5 operating that cell 9.

The base station 5 is connected to the core network 7 for example via an S1 interface and to any other base stations (not shown) for example via an X2 interface (either directly, or via for example an X2 gateway). The core network 7 typically includes logical nodes (or 'functions') for supporting communication in the telecommunication system 1. Typically, for example, the core network 7 of a 5G/NR system will include, amongst other functions, control plane functions, user plane functions and other functions for providing the functionality of a mobility management entity (MME), a serving gateway (S-GW), a packet data network gateway (P-GW) etc.

Figure 2:
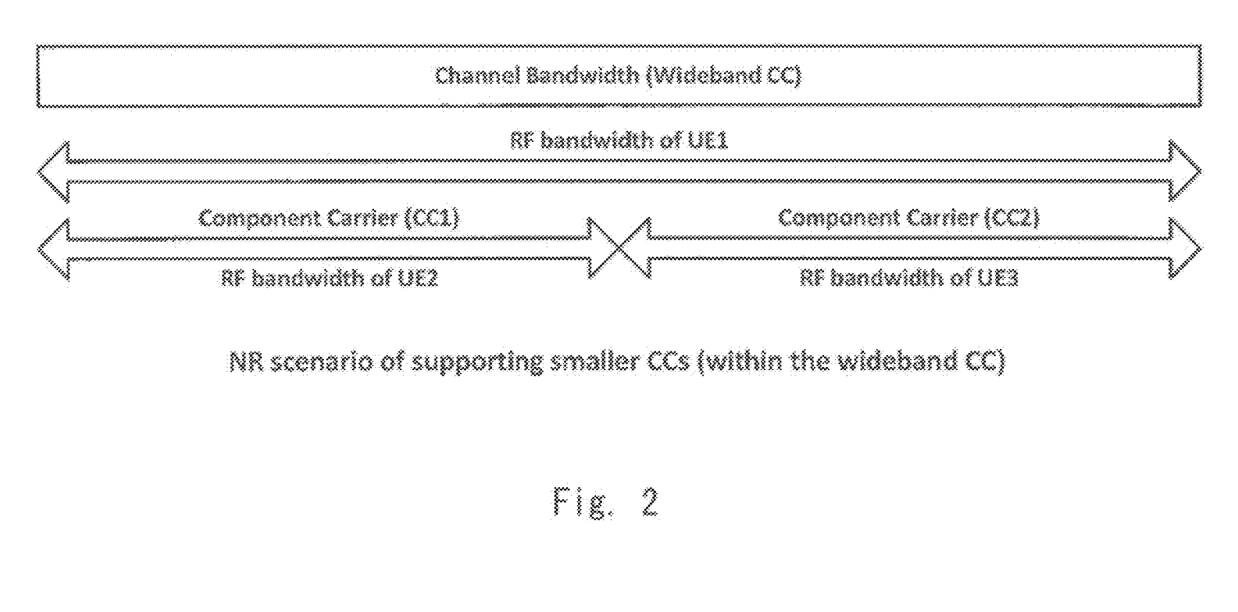
FIG. 2 schematically illustrates a scenario of supporting smaller component carriers within the wideband component carrier used in the system of FIG. 1.

In this system the system bandwidth (or 'wideband CC') can comprise a number of smaller component carriers. Therefore, the base station 5 is configured to operate its cell 9 simultaneously with multiple component carriers, some of which may have a different bandwidth to that of the wideband CC. In this example, which is illustrated in FIG. 2, the base station 5 simultaneously operates a wideband CC (i.e. a single carrier spanning the entire system bandwidth) at least for some UEs 3, and for other UEs 3 it operates a set of intra-band contiguous CCs (herein 'CC1' and 'CC2') which are effectively carriers within the wideband CC having a relatively smaller associated bandwidth compared to the system bandwidth.

This arrangement beneficially allows different UEs 3 to transmit and receive data over an appropriate part of the system bandwidth (e.g. the entire system bandwidth or only a portion thereof) depending on their needs and capabilities (as some of the UEs may be equipped with transceivers that support only a limited bandwidth). For example, as shown in FIG. 2, UE1 is configured to receive or transmit over the whole network channel bandwidth since it is capable of handling a wider RF bandwidth, while UE2 and UE3 use only a part of the channel bandwidth due to e.g. their limited RF bandwidth and/or their current communication needs/settings. Although not shown, it will be appreciated that some UEs may be able to aggregate multiple component carriers (intra-band contiguous CCs with CA), when appropriate. For example, UE2 may be able to aggregate CC1 and CC2 (and/or any other CCs, within the same or in a different cell) when the bandwidth of CC1 is not sufficient. Similarly, UE1 may be able to aggregate the wideband CC and one or more additional CC (e.g. one or more additional cell) when the bandwidth of the wideband CC is not sufficient for that UE.

In order to assist the UEs 3 in finding its cell 9 and to be able to access the various CCs, the base station 5 provides system information in the cell 9. Whilst some system information provided may be required by all UEs 3 in the cell 9 and may need to be transmitted (e.g. broadcast) on a relatively regular basis, other system information may not be required by all UEs 3 in the cell 9 at a given time and/or may not need to be sent on such a regular basis. Accordingly, the system information is divided conceptually into two different types: minimum system information and other system information.

Referring to the minimum system information, the base station 5 broadcasts at least some of the minimum system information in its cell 9. In this example, the minimum system information includes a subset of the information blocks (such as MIB, SIB1, SIB2 and/or the like) carrying at least a part of the minimum set of information elements (e.g. those elements required to support cell selection, acquiring the remaining system information, or accessing the cell). The remaining minimum system information (RMSI) and potentially any other system information can be obtained by the UEs 3 using appropriate mechanisms (e.g. 'on-demand' at the request of the UE). For example, UEs 3 in an RRC connected state may use dedicated RRC signalling for the request and delivery of the RMSI.

Advantageously, in this network 1 the same PRB grid structure is used for a given numerology within the wideband CC regardless of the type or operation of UE 3 (narrowband UE, CA UE, or wideband UE). Some exemplary numerologies are shown in Table 1 below.

In LTE systems, when a UE decodes the PBCH, the UE can work out the PRB and RBG indexing straight away because the PBCH and synchronisation signals (i.e. the 'SS block') are always located at the centre frequency (i.e. the central 6RBs) of the LTE system bandwidth. On the other hand, in NR systems (e.g. as shown in FIG. 1) the SS block (which corresponds to the location of the NR-PBCH) may not necessarily be at the centre frequency of the network channel bandwidth.

However, the base station 5 of this system beneficially uses appropriate PRB indexing in order to facilitate acquisition of NR-PBCH and RMSI by the UEs 3, regardless of how the wideband CC is divided into intra-band CCs. Thus, based in such a PRB indexing, it is possible to determine the precise location of a detected SS block within the network channel bandwidth in order for the UEs 3 to be able to determine the associated resource block (RB) indexing (including the location of reference signals), derive channel state information (CSI), and obtain system information for the cell 9.

In more detail, during the acquisition of NR-PBCH, there is a relative time between the NR-PBCH and the position of the synchronisation signals (SS), therefore the location of the NR-PBCH can be determined based on the position of the SS. In addition, since the number of PRBs carrying the NR-PBCH is fixed, there is no need for PRB indexing as there is no resource allocation signalling involved at this stage. Accordingly, the UEs 3 are able to obtain at least a part of the minimum system information from the NR-PBCH.

However, during acquisition of the RMSI (transmitted by the base station 5 over the NR-PDSCH and/or the NR-PBCH), the number of PRBs that can be scheduled to the RMSI are variable since it depends on the amount of information to be transmitted (and possibly on other factors, such as modulation being used). Therefore, the base station 5 employs a special scheme to indicate RMSI scheduling assignments to the UEs 3, based on the exemplary PRB indexing methods described below.

In summary, in its allocation of resources to the RMSI, the base station 5 may employ a bandwidth for the RMSI that is confined within the bandwidth of the NR-PBCH ('option 1') or employ a bandwidth for the RMSI that is larger than the bandwidth of the NR-PBCH ('option 2').

In case of both option 1 and option 2, the PRB indexing for RMSI starts from the lowest frequency of the NR-PBCH BW, and the granularity of the resource allocation scheme for RMSI scheduling is 1 PRB. In case of option 2 (i.e. when the bandwidth of the RMSI is greater than the bandwidth of the decoded NR-PBCH), the difference between the RMSI bandwidth and the NR-PBCH bandwidth (e.g. an offset amount) is given in terms of PRBs and the difference is signalled in the NR-PBCH. This beneficially allows the UEs 3 to obtain the location and bandwidth of the NR-PBCH (based on the detected SS block) and hence obtain at least a part of the minimum system information, then determine the RMSI bandwidth (which may equal to the NR-PBCH bandwidth or the NR-PBCH bandwidth+an offset) from the NR-PBCH.

When the base station 5 signals an offset value to the UEs 3, the reference point for applying the offset may be either the lowest PRB of the NR-PBCH (in which case the offset increases the bandwidth upwards from the highest frequency of the NR-PBCH) or the centre PRB of the NR-PBCH (in which case the offset increases the bandwidth symmetrically both downwards from the lowest frequency of the NR-PBCH and upwards from the highest frequency of the NR-PBCH). Further details of the operation of the offset are given below with reference to FIGS. 5 and 6.

Beneficially, the RMSI in this system includes information that allows the UE 3 to derive the location of the NR-PBCH relative to the network channel bandwidth (regardless of which component carrier is used by that UE 3). Thus, once the UE 3 has decoded the RMSI, it knows the location of the decoded NR-PBCH within the network channel bandwidth as well as the size of the network channel bandwidth.

It can be seen therefore that the above system meets the various requirements currently agreed for NR base stations that are configured to operate with multiple component carriers simultaneously (e.g. a wideband CC and one or more intra-band CCs within the wideband CC). The above solutions make it easier for UEs to access the RAN and/or receive system information (e.g. RMSI) via their associated carrier (wideband CC, CC1, CC2).

It will be appreciated that whilst a number of beneficial features are described above, an improved cellular communication system can still be realised even if only a subset (or one) of the beneficial features is employed.

User Equipment

Figure 3:
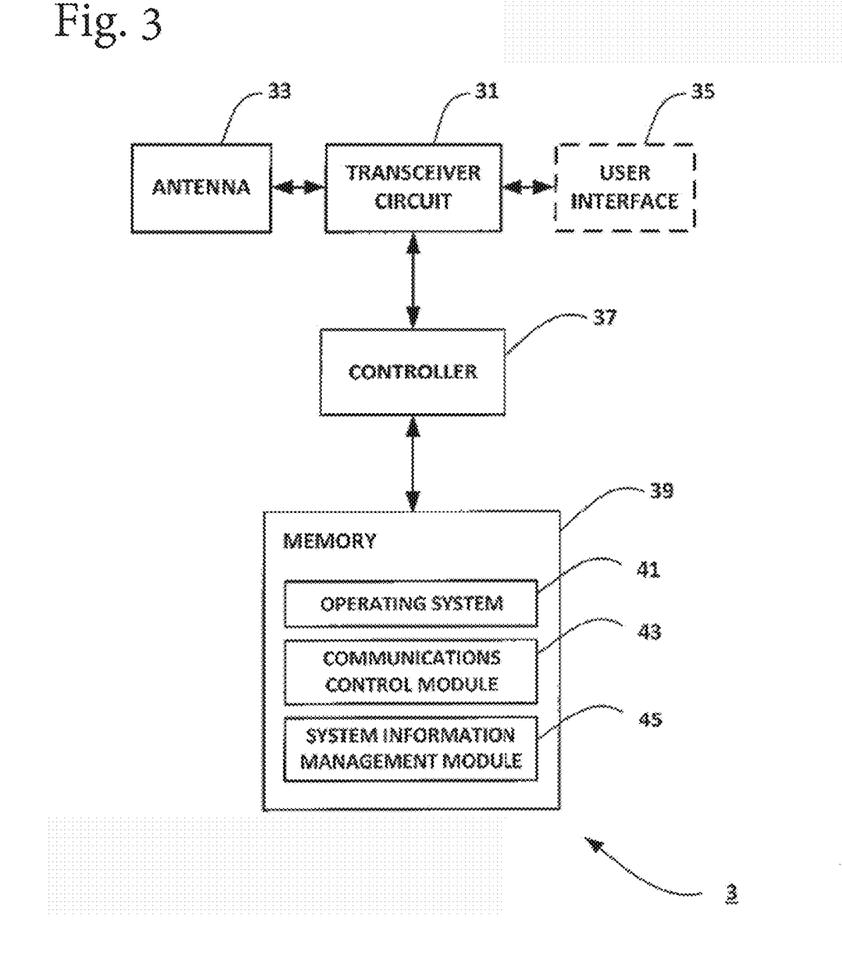
FIG. 3 is a simplified block diagram of physical apparatus for implementing user equipment suitable for use in the cellular telecommunication system of FIG. 1.

FIG. 3 is a block diagram illustrating the main components of user equipment (such as a mobile telephone) 3 shown in FIG. 1. As shown, the UE 3 has a transceiver circuit 31 that is operable to transmit signals to and to receive signals from a base station (e.g. a gNB) 5 via one or more antennae 33. Although not necessarily shown in FIG. 3, the UE 3 may of course have all the usual functionality of a conventional UE 3 (such as a user interface 35) and this may be provided by any one or any combination of hardware, software and firmware, as appropriate. The UE 3 has a controller 37 to control the operation of the user equipment 3.

The controller 37 is associated with a memory 39 and is coupled to the transceiver circuit 31. Software may be pre-installed in the memory 39 and/or may be downloaded via the telecommunications network 1 or from a removable data storage device (RMD), for example.

The controller 37 is configured to control overall operation of the UE 3 by, in this example, program instructions or software instructions stored within the memory 39. As shown, these software instructions include, among other things, an operating system 41, a communications control module 43 and a system information management module 45.

The communications control module 43 is operable to control communications between the UE 3 and the base station 5. The communications control module 43 also controls the separate flows of uplink data and control data that are transmitted to the base station 5 and the reception of downlink data and control data (including system information) transmitted by the base station 5. The communications control module 43 is responsible, for example, for managing the UE's part in idle and connected mode procedures such as cell (re)selection, camping on cells, random access channel (RACH) procedures, etc.

The system information management module 45 is responsible for managing the listening for, receipt, storage and interpretation of the system information (minimum system information and/or other system information), for deriving appropriate indexing being used in the cell 9 of the base station 5 to which the UE 3 is connected (or attempts to connect). Specifically, the system information management module 45 is responsible for determining the location of the RMSI within the system bandwidth (for a given CC and/or numerology).

Base Station (gNB)

Figure 4:
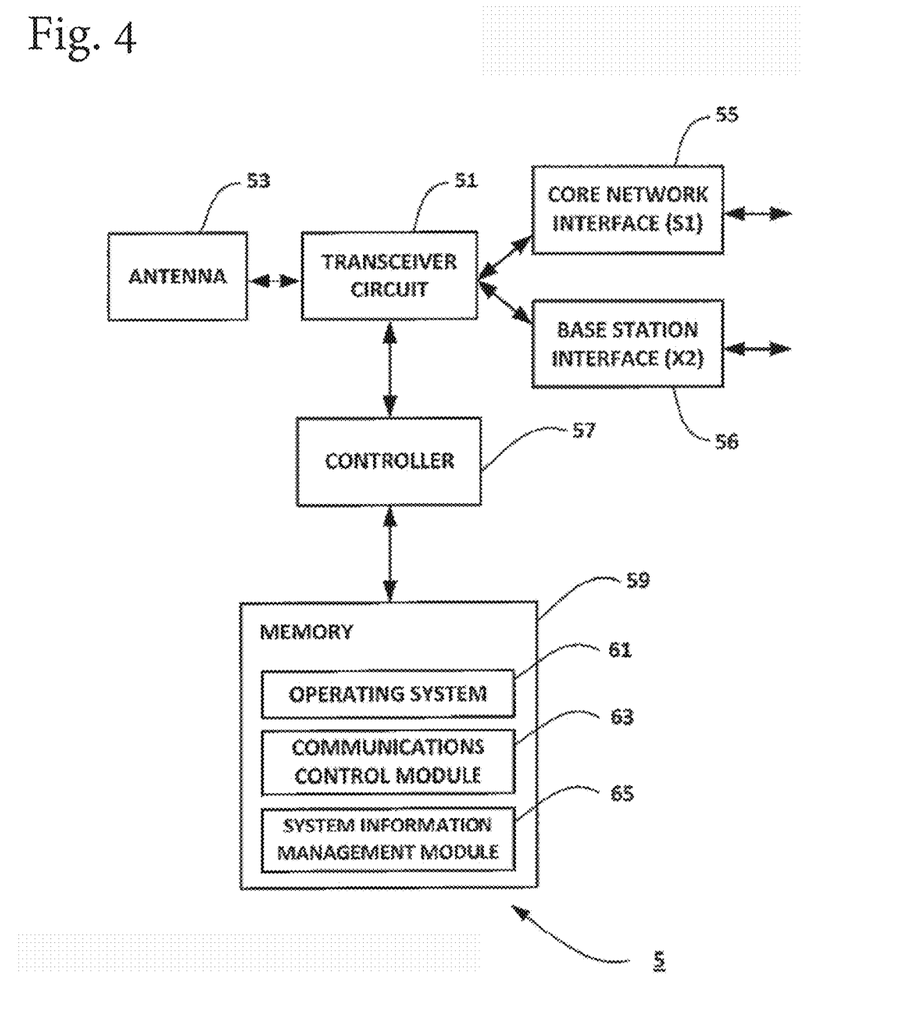
FIG. 4 is a simplified block diagram of physical apparatus for implementing a base station suitable for use in the cellular telecommunication system of FIG. 1.

FIG. 4 is a block diagram illustrating the main components of a base station 5 of the type shown in FIG. 1. As shown, the base station 5 includes a transceiver circuit 51 which is operable to transmit signals to and to receive signals from UEs 3 via one or more antennae 53 and which is operable to transmit signals to and to receive signals from the functions of the core network 7 via a core network interface 55 and/or other base stations via a base station interface 56. The network interface typically comprises an S1 (or S1-like) interface for communicating with the core network 7 and an X2 (or X2-like) interface for communicating with other base stations. A controller 57 controls the operation of the transceiver circuit 51 in accordance with software stored in the memory 59. The software includes, among other things, an operating system 61, a communications control module 63 and a system information management module 65. Software may be pre-installed in the memory 59 and/or may be downloaded via the telecommunications network 1 or from a removable data storage device (RMD), for example.

The communications control module 63 is operable to control communications between the base station 5 and the UEs 3 and other network entities that are connected to the base station 5. The communications control module 63 also controls the separate flows of uplink and downlink user traffic and control data (including system information) for the UEs 3 served by the base station 5. Such control data may also include, for example, control data for managing the operation of the UEs 3 and for the provision of the RMSI (e.g. PRB scheduling/PRB indexing). The communications control module 63 is responsible, for example, for controlling procedures such as the communication of measurement control/configuration information, system information, the base station's part in random access channel (RACH) procedures, etc.

The system information management module 65 is responsible for managing the generation of system information (SI) messages carrying appropriate system information (minimum system information and/or other system information), for determining whether to transmit a particular piece (block) of system information (to a given UE or UE group), and for providing an appropriate indexing for the cell 9 of the base station 5 for the provision of the system information. The system information management module 65 is also responsible for allocating appropriate resources for the RMSI within the system bandwidth (for a given CC and/or numerology) such that UEs 3 that need it can obtain it. Such resources are typically allocated in a broadcast channel (e.g. NR-PBCH) or another shared channel (e.g. NR-PDSCH).

Operation—PRB Indexing During Acquisition of NR-PBCH and RMSI

Figure 5:
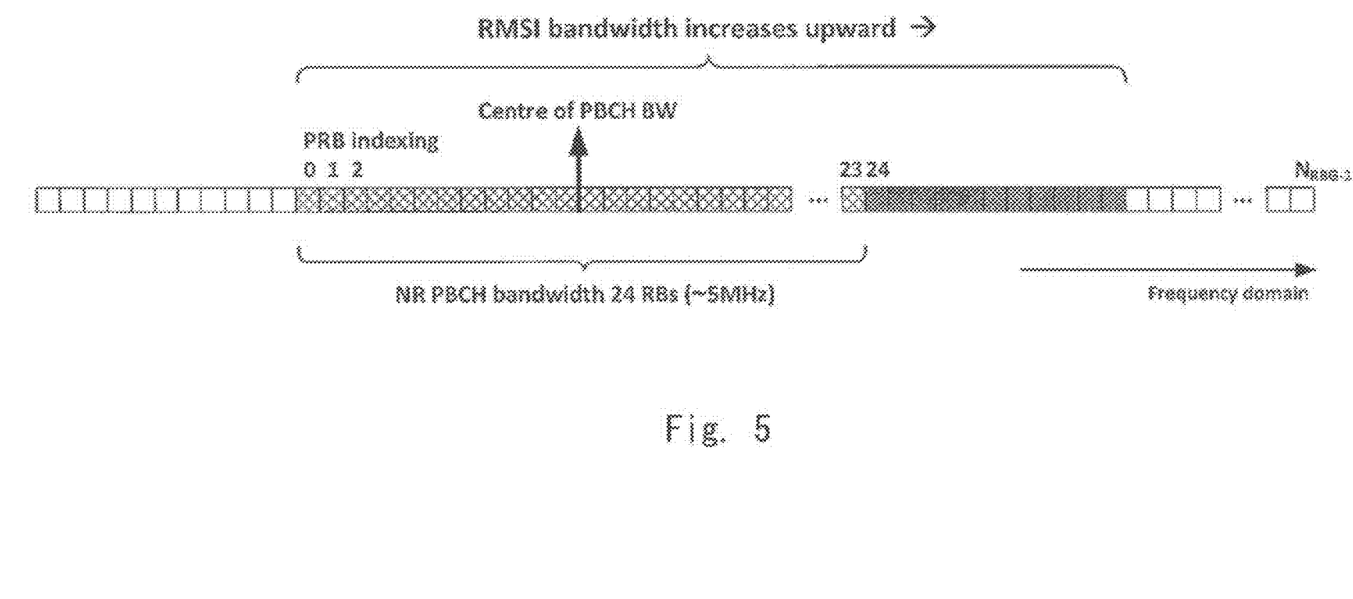
FIG. 5 schematically illustrates an exemplary way in which RMSI bandwidth may be defined with relation to the PBCH bandwidth in the system of FIG. 1.
Figure 6:
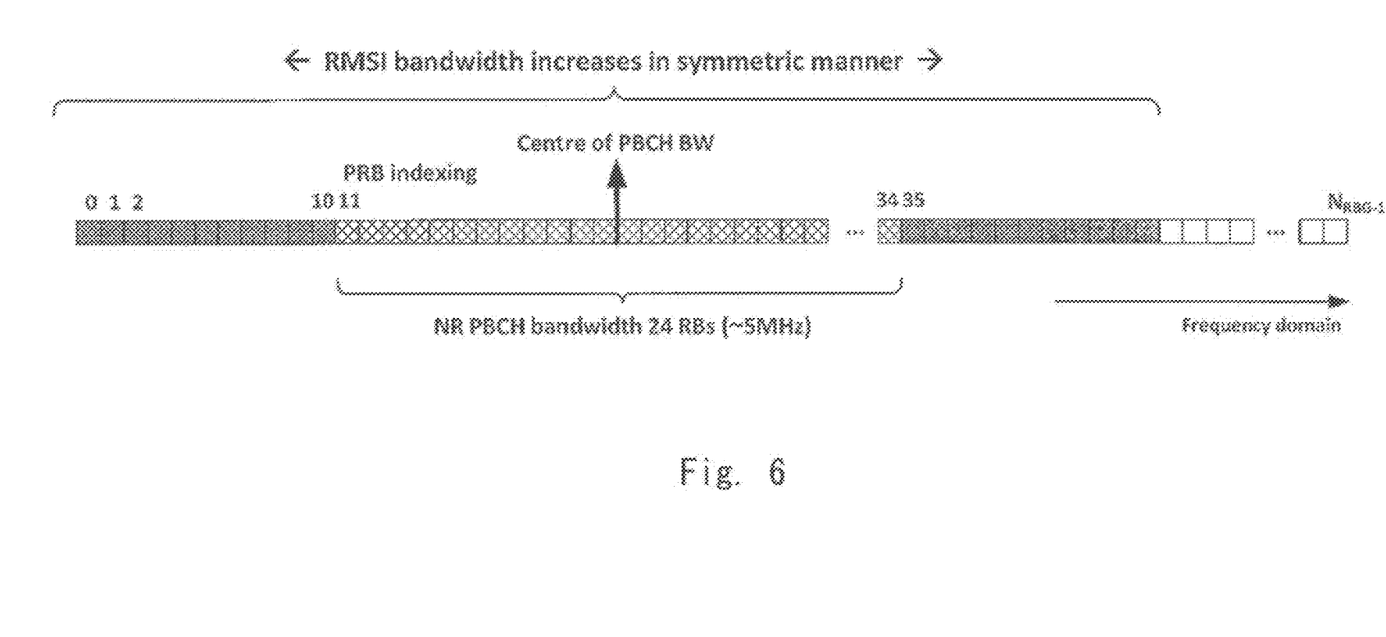
FIG. 6 schematically illustrates an exemplary way in which RMSI bandwidth may be defined with relation to the PBCH bandwidth in the system of FIG. 1.

FIGS. 5 and 6 schematically illustrate exemplary ways in which RMSI bandwidth may be defined with relation to the PBCH bandwidth in the system 1 of FIG. 1.

As described above, the SS block that contains the NR-PBCH may not necessarily be at the centre frequency of the network channel bandwidth (in NR systems). Moreover, there might be multiple component carriers provided simultaneously within the network channel bandwidth.

The following exemplary mechanism may be used to provide a precise location of the detected SS block within the network channel bandwidth in order the UEs to be able to determine the resource block (RB) indexing, generate reference signal (RS) and derive the channel state information (CSI).

Since there is a known (predefined) relative time between the NR-PBCH and the position of the synchronisation signals, the location of the NR-PBCH can be easily determined by the UE 3 once it has detected the synchronisation signals. In addition, the number of PRBs carrying the NR-PBCH is fixed, so, there is no need for PRB indexing as there is no resource allocation signalling involved at this stage. In other words, the UE 3 is configured to decode the content of the entire NR-PBCH (which will typically include at least a part of the minimum system information).

During the acquisition of the RMSI (i.e. the part of the minimum system information that was not included in the initial NR-PBCH transmission), the number of PRBs that can be scheduled to RMSI can be variable (depending on e.g. the amount of information to be transmitted). Therefore, RMSI scheduling assignments (based on for example PRB indexing) are carried out for handling the resource allocation for the RMSI transmission.

In a first example, the bandwidth of the RMSI (for both control and data signalling) is confined within the bandwidth of the NR-PBCH. This may be possible, for example, if the size of the RMSI is relatively small. In this case, therefore, the PRBs can be indexed in the order of increasing frequency-domain (i.e. from the lowest to the highest frequency of the NR-PBCH bandwidth). However, as the UE 3 may not know the network channel bandwidth at this phase yet, it is not required to derive the appropriate global PRB and RBG indexing. Thus, any PRB indexing for the RMSI (if provided) is to be interpreted within the set of PRBs corresponding to the NR-PBCH bandwidth (rather than the network channel bandwidth).

In this example, the preferred granularity of the resource allocation scheme for RMSI scheduling is 1 PRB as this does not have an impact on other active UEs in the same cell that are scheduled based on e.g. RBG granularity. However, it will be appreciated that any other suitable granularity may be chosen, where appropriate.

In a second example, the bandwidth of the RMSI (for control and data signalling) can be larger than the bandwidth of the NR-PBCH. In other words, in this case the RMSI bandwidth includes (or overlaps with) the set of PRBs corresponding to the NR-PBCH bandwidth and a set of additional PRBs (at least one PRB). If the bandwidth required for the RMSI is larger than the bandwidth of the NR-PBCH, then the PRBs can be indexed for example in the order of increasing frequency-domain starting from the lowest frequency of the NR-PBCH bandwidth and continuing upward. In this case the lowest PRB of the NR-PBCH bandwidth serves as the reference point for determining the scheduling of the RMSI. Thus, if more resources are needed than the resources corresponding to the NR-PBCH bandwidth, the resource allocation span can simply be increased further upward (as shown in FIG. 5). Alternatively, as shown in FIG. 6, with the lowest PRB of the NR-PBCH bandwidth being the reference point, the resource allocation span can be increased in symmetric manner, by extending (by an equal amount) both the lowest and highest PRBs for RMSI scheduling beyond the size of the NR-PBCH bandwidth. Beneficially, the expanded RMSI bandwidth (e.g. a total bandwidth/total number of PRBs), or at least the amount of increase (e.g. an offset/number of PRBs in addition to the NR-PBCH bandwidth) can be signalled to the UEs in the NR-PBCH.

In summary, the bandwidth of the RMSI is preferably confined within the bandwidth of the decoded NR-PBCH (at least when the size of the RMSI allows it). In this case, PRB indexing for RMSI may start from the lowest frequency of the NR-PBCH bandwidth, and the granularity of the resource allocation scheme for RMSI scheduling may be 1 PRB. If the bandwidth of the RMSI is increased compared to the bandwidth of the decoded NR-PBCH (e.g. depending on the size of the RMSI and/or UE capability), the amount of increase (e.g. an offset) in terms of PRBs may be signalled to the UEs in the NR-PBCH. This beneficially allows each UE to determine the appropriate RMSI bandwidth for that UE from the NR-PBCH (wherein the RMSI bandwidth may equal to the NR-PBCH bandwidth or the NR-PBCH bandwidth+an offset). Alternatively, an offset from the lowest PRB index of the channel bandwidth (or bandwidth part) to the lowest PRB index or the centre of the NR-PBCH can be signalled in the NR-PBCH.

Operation—PRB Indexing after UE Decoded the RMSI

Figure 7:
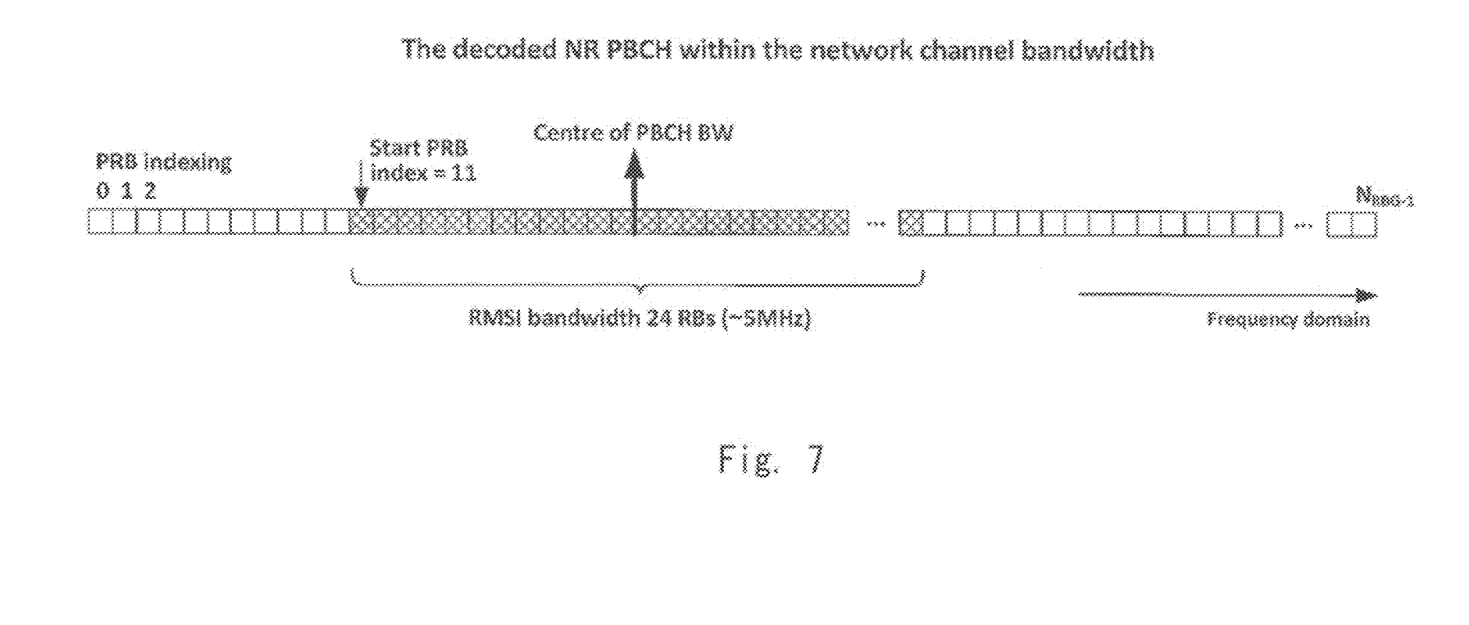
FIG. 7 schematically illustrates an exemplary way in which the location of the PBCH may be derived in the cellular telecommunication system of FIG. 1.
Figure 8:
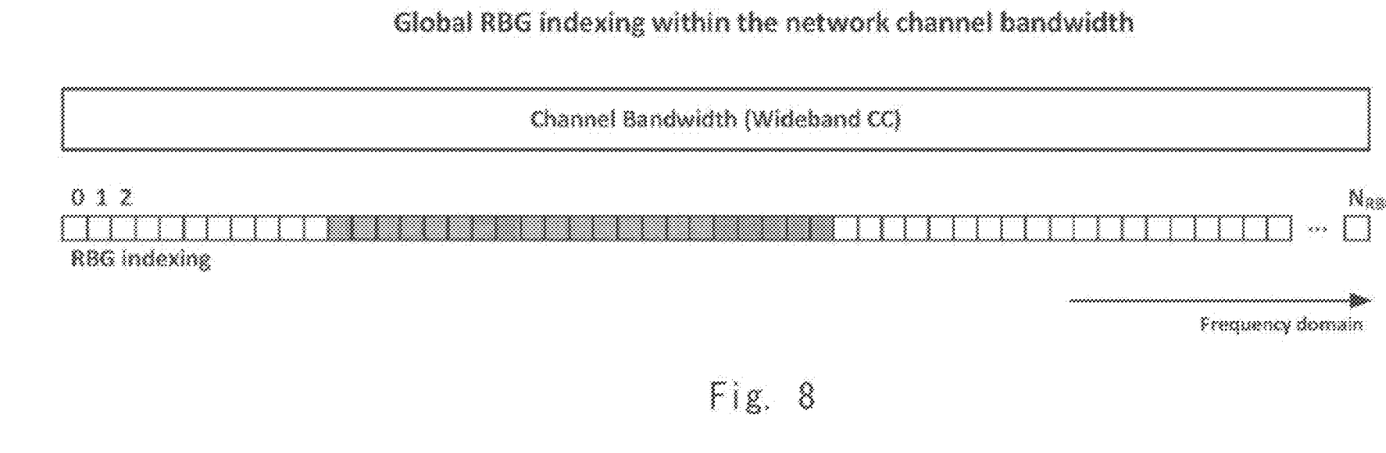
FIG. 8 schematically illustrates an exemplary way in which global RBG indexing may be provided in the cellular telecommunication system of FIG. 1.

FIG. 7 illustrates an exemplary way for deriving the location of the PBCH in NR systems (such as the cellular telecommunication system 1 shown in FIG. 1). Moreover, FIG. 8 illustrates a possible (global) RBG indexing for such NR systems.

After the UE 3 has decoded the RMSI and any information included in the RMSI (based on for example one of the techniques described with reference to FIGS. 5 and 6), the UE 3 immediately knows the location of the NR-PBCH within the network channel bandwidth as well as the size of the network channel bandwidth explicitly.

For example, the UE 3 may be informed about the location of the decoded NR-PBCH (and/or the detected SS block) within the network channel bandwidth via the RMSI by signalling the starting PRB index of the decoded NR-PBCH using the PRB indexing of the wider channel bandwidth. Effectively, the indication of the starting PRB index of the decoded NR-PBCH serves as an indication of an offset for the NR-PBCH from the first PRB of the system bandwidth (i.e. the PRB having index '0'), from which the UE 3 is able to work out the location of the first PRB (and hence any other PRB) of the system bandwidth based on the applicable subcarrier spacing/numerology.

This approach is generally illustrated in FIG. 7. In this example shown, the starting PRB (or offset) of the RMSI (or the starting PRB of the PBCH, when the RMSI is confined within the PBCH or it extends upwards only) has a PRB index '11'. Thus, in this example, the value '11' may be included in the RMSI (e.g. in an appropriate information element thereof). This beneficially allows the base station 5 to provide the NR-PBCH (and the SS block and/or RMSI) anywhere within its associated system bandwidth (not only in the centre portion) and may in turn allow greater flexibility for providing multiple CCs within the system bandwidth.

The UE 3 is configured to take the received PRB information (signalled via the RMSI) as a reference point for determining the global PRB indexing within the network channel bandwidth. When the UE 3 knows the global PRB indexing based on the reference point, it can also work out the number of RBGs within the network channel bandwidth. For example, as illustrated in FIG. 8, the RBGs may be indexed in the order of increasing frequency-domain (i.e. staring from the lowest frequency) for a given subcarrier spacing/numerology.

Modifications and Alternatives

A number of detailed example embodiments have been described above. As those skilled in the art will appreciate, a number of modifications and alternatives can be made to the above example embodiments whilst still benefiting from the inventions embodied therein. By way of illustration only a number of these alternatives and modifications will now be described.

It is assumed in the above examples that the PBCH and RMSI are using same numerologies (i.e. the same subcarrier spacing and CP length). However, if there are different numerologies, the numerologies may preferably be aligned from the centre of the PBCH bandwidth so that the amount of PRBs used for the RMSI on both sides is equal before expanding the RMSI bandwidth. Effectively, this means that the PRB boundary for different numerologies is always aligned from the centre of the PBCH bandwidth. As agreed in RAN1, alignment means that if the subcarriers in a PRB are numbered from '0' to '11', for a given SCS F0, then subcarrier '0' always coincides with a subcarrier '0' of all SCS of order less than F0.

TABLE 1 example numerologies

| Subcarrier spacing (SCS) | 15 kHz | 75 kHz | 375 kHz |
|---|---|---|---|
| Sampling clock rate (MHz) | 30.72 | 153.6 | 768 |
| OFDM symbol duration, no CP (us) | 66.67 | 13.33 | 2.67 |
| CP duration (us) | 4.7 | 0.95 | 0.19 |
| CP overhead (%) | 7 | 7 | 7 |
| Symbols per TTI | 14 | 14 | 35 |
| TTI duration (ms) | 1 | 0.2 | 0.1 |
| Frame duration (ms) | 10 | 10 | 10 |

In the above example embodiments, a number of software modules were described for implementing the user equipment 3 and base station 5. As those skilled will appreciate, such software modules may be provided in compiled or un-compiled form and may be supplied to the corresponding hardware as a signal over a computer network, or on a recording medium. Further, the functionality performed by part or all of this software may be performed using one or more dedicated hardware circuits. However, the use of software modules is preferred as it facilitates the updating of the corresponding hardware in order to update its functionality. Similarly, although the above example embodiments employed transceiver circuitry, at least some of the functionality of the transceiver circuitry can be performed by software.

The functionality of the user equipment 3 and base station 5 will typically be implemented using one or computer processing apparatus having one or more hardware computer processors programmed using appropriate software instructions to provide the required functionality. It will be appreciated that all or part of this functionality may be implemented in hardware as dedicated circuitry for example using one or more dedicated integrated circuits such as an application specific integrated circuit (ASIC) or the like.

It will be appreciated that the controllers referred to in the description of the UE 3, and base station 5 may comprise any suitable controller such as, for example an analogue or digital controller. Each controller may comprise any suitable form of processing circuitry including (but not limited to), for example: one or more hardware implemented computer processors; microprocessors; central processing units (CPUs); arithmetic logic units (ALUs); input/output (IO) circuits; internal memories/caches (program and/or data); processing registers; communication buses (e.g. control, data and/or address buses); direct memory access (DMA) functions; hardware or software implemented counters, pointers and/or timers; and/or the like.

Whilst the base station 5 has been described in terms of a gNB it may be any suitable base station including a base station in which the functionality of a gNB may be split between one or more distributed units (DUs) and a central unit (CU) with a CU typically performing higher level functions and communication with the next generation core and with the DU performing lower level functions and communication over an air interface with user equipment (UE) in the vicinity (i.e. in a cell operated by the gNB).

In the above example embodiments, the base station uses a 3GPP radio communications (radio access) technology to communicate with the mobile device. However, any other radio communications technology (i.e. WLAN, Wi-Fi, WiMAX, Bluetooth, etc.) can be used between the base station and the mobile device in accordance with the above example embodiments.

Items of user equipment might include, for example, communication devices such as mobile telephones, smartphones, user equipment, personal digital assistants, laptop/tablet computers, web browsers, e-book readers and/or the like. Such mobile (or even generally stationary) devices are typically operated by a user, although it is also possible to connect so-called 'Internet of Things' (IoT) devices and similar machine-type communication (MTC) devices to the network. For simplicity, the present application refers to mobile devices (or UEs) in the description but it will be appreciated that the technology described can be implemented on any communication devices (mobile and/or generally stationary) that can connect to a communications network for sending/receiving data, regardless of whether such communication devices are controlled by human input or software instructions stored in memory.

It will be appreciated that the following modifications and alternatives are also possible (using the wording of the above described aspects of the invention):

The at least one further communication resource may be dependent on (e.g. confined within or overlaps with) the first set of at least one communication resource.

The information identifying an allocation may comprise at least one of: information identifying an index associated with a physical resource block (PRB); and a number of PRBs (e.g. an offset) representing a difference compared to the first set of at least one communication resource. In this case, the PRBs within the first set of at least one communication resource may be indexed in order of increasing frequency-domain. Preferably, the resource allocation may have a granularity of one PRB.

The minimum system information may comprise minimum parameters required to access one of a plurality of component carriers (CCs) associated with the cell. In this case, the plurality of component carriers may comprise at least one wideband CC and/or at least one intra-band CC.

The first set of communication resources may comprise a predetermined set of communication resources (which may be dependent on e.g. a location of at least one synchronisation signal transmitted in the cell and/or a numerology associated with the cell).

The minimum system information may comprise information identifying the location of the PBCH and/or the remaining minimum system information (RMSI) within the network channel bandwidth of the cell (e.g. an index of a starting PRB of the PBCH/RMSI within the network channel bandwidth). In this case, the communication device may be configured to determine a global PRB indexing within a network channel bandwidth based on the received information identifying the location of the PBCH/RMSI within the network channel.

The communication apparatus may comprise a base station (e.g. a 'gNB') for a New Radio (NR) system, and the communication device may comprise user equipment (UE) for a NR system.

Various other modifications will be apparent to those skilled in the art and will not be described in further detail here.

The whole or part of the example embodiments disclosed above can be described as, but not limited to, the following supplementary notes.

(Supplementary note 1) A method performed by communication apparatus of a radio access network, RAN, of a telecommunication system, the method comprising:
controlling transmission of minimum system information comprising minimum parameters required by a user equipment, UE, to access a cell of the telecommunication system, wherein the minimum system information comprises at least an initial part comprising part of said minimum system information and a remaining part comprising a remaining part of the minimum system information;
transmitting at least the initial part of the system information via a physical broadcast channel, PBCH, using a first set of at least one communication resource;
transmitting information identifying an allocation of at least one further communication resource; and
transmitting at least the remaining part of the minimum system information using the at least one further communication resource identified by the allocation.

(Supplementary note 2) The method according to Supplementary note 1, wherein the at least one further communication resource is dependent on (e.g. confined within or overlaps with) the first set of at least one communication resource.

(Supplementary note 3) The method according to Supplementary note 1 or 2, wherein the information identifying an allocation comprises at least one of:
information identifying an index associated with a physical resource block, PRB; and a number of PRBs (e.g. an offset) representing a difference compared to the first set of at least one communication resource.

(Supplementary note 4) The method according to Supplementary note 3, wherein PRBs within the first set of at least one communication resource are indexed in order of increasing frequency-domain.

(Supplementary note 5) The method according to any of Supplementary notes 1 to 4, wherein the resource allocation has a granularity of one PRB.

(Supplementary note 6) The method according to any of Supplementary notes 1 to 5, wherein the minimum system information comprises minimum parameters required to access one of a plurality of component carriers, CCs, associated with the cell.

(Supplementary note 7) The method according to Supplementary note 6, wherein the plurality of component carriers comprises at least one wideband CC and/or at least one intra-band CC.

(Supplementary note 8) The method according to any of Supplementary notes 1 to 7, wherein the first set of communication resources comprises a predetermined set of communication resources (e.g. dependent on a location of at least one synchronisation signal transmitted in the cell/dependent on a numerology associated with the cell).

(Supplementary note 9) The method according to any of Supplementary notes 1 to 8, wherein the minimum system information comprises information identifying the location of the PBCH and/or the remaining part of the minimum system information within the network channel bandwidth of the cell (e.g. an index of a starting PRB of the PBCH/RMSI within the network channel bandwidth).

(Supplementary note 10) The method according to any of Supplementary notes 1 to 9, wherein the communication apparatus comprises a base station (e.g. 'gNB') for a New Radio, NR, system.

(Supplementary note 11) A method performed by a communication device for obtaining minimum system information comprising minimum parameters required to access a cell of a radio access network, RAN, of the telecommunication system, wherein the minimum system information comprises at least an initial part comprising part of said minimum system information and a remaining part comprising a remaining part of the minimum system information, the method comprising:
receiving at least the initial part of the system information via a physical broadcast channel, PBCH, using a first set of at least one communication resource;
receiving information identifying an allocation of at least one further communication resource; and
receiving at least the remaining part of the minimum system information using the at least one further communication resource identified by the allocation.

(Supplementary note 12) The method according to Supplementary note 11, wherein the minimum system information comprises information identifying the location of the PBCH and/or the remaining part of the minimum system information within the network channel bandwidth of the cell (e.g. an index of a starting PRB of the PBCH/RMSI).

(Supplementary note 13) The method according to Supplementary note 12, further comprising determining a global PRB indexing within a network channel bandwidth based on the received information identifying the location of the PBCH and/or the remaining part of the minimum system information within the network channel bandwidth.

(Supplementary note 14) The method according to any of Supplementary notes 11 to 13, wherein the communication device comprises user equipment, UE, for a New Radio, NR, system.

(Supplementary note 15) A method performed by communication apparatus of a radio access network, RAN, of a telecommunication system, the method comprising:
transmitting minimum system information comprising minimum parameters required by a user equipment, UE, to access a cell of the telecommunication system, wherein the minimum system information comprises at least an initial part comprising part of said minimum system information and a remaining part comprising remaining minimum system information, RMSI;
wherein the minimum system information comprises information identifying the location, within a network channel bandwidth of the cell, of at least one of: a physical broadcast channel, PBCH; and the RMSI.

(Supplementary note 16) A method performed by a communication device of a radio access network, RAN, of a telecommunication system, the method comprising:
receiving minimum system information comprising minimum parameters required to access a cell of the telecommunication system, wherein the minimum system information comprises at least an initial part comprising part of said minimum system information and a remaining part comprising remaining minimum system information, RMSI;
wherein the minimum system information comprises information identifying the location, within a network channel bandwidth of the cell, of at least one of: a physical broadcast channel, PBCH; and the RMSI.

(Supplementary note 17) Communication apparatus of a radio access network, RAN, of a telecommunication system, the communication apparatus comprising:
  means for controlling transmission of minimum system information comprising minimum parameters required by a user equipment, UE, to access a cell of the telecommunication system, wherein the minimum system information comprises at least an initial part comprising part of said minimum system information and a remaining part comprising a remaining part of the minimum system information;
  means for transmitting at least the initial part of the system information via a physical broadcast channel, PBCH, using a first set of at least one communication resource;
  means for transmitting information identifying an allocation of at least one further communication resource; and
  means for transmitting at least the remaining part of the minimum system information using the at least one further communication resource identified by the allocation.

(Supplementary note 18) A communication device comprising:
  means for obtaining minimum system information comprising minimum parameters for accessing a cell of a radio access network, RAN, of the telecommunication system, wherein the minimum system information comprises at least an initial part comprising part of said minimum system information and a remaining part comprising a remaining part of the minimum system information;
  means for receiving at least the initial part of the system information via a physical broadcast channel, PBCH, using a first set of at least one communication resource;
  means for receiving information identifying an allocation of at least one further communication resource; and
  means for receiving at least the remaining part of the minimum system information using the at least one further communication resource identified by the allocation.

(Supplementary note 19) Communication apparatus of a radio access network, RAN, of a telecommunication system, the communication apparatus comprising:
  means for transmitting minimum system information comprising minimum parameters required by a user equipment, UE, to access a cell of the telecommunication system, wherein the minimum system information comprises at least an initial part comprising part of said minimum system information and a remaining part comprising a remaining part of the minimum system information;
  wherein the minimum system information comprises information identifying the location, within a network channel bandwidth of the cell, of at least one of: a physical broadcast channel, PBCH; and the RMSI.

(Supplementary note 20) A communication device of a radio access network, RAN, of a telecommunication system, the communication device comprising:
  means for receiving minimum system information comprising minimum parameters required to access a cell of the telecommunication system, wherein the minimum system information comprises at least an initial part comprising part of said minimum system information and a remaining part comprising a remaining part of the minimum system information;
  wherein the minimum system information comprises information identifying the location, within a network channel bandwidth of the cell, of at least one of: a physical broadcast channel, PBCH; and the RMSI.

(Supplementary note 21) A system comprising the communication apparatus according to Supplementary note 17 or 19 and the communication device according to Supplementary note 18 or 20.

(Supplementary note 22) A computer program readable storage media having instructions stored thereon which are operable to program a programmable processor to carry out a method according to any of Supplementary notes 1 to 16 or to program a suitably adapted computer to operate as the communication apparatus according to Supplementary note 17 or 19 or the communication device according to Supplementary note 18 or 20.

This application is based upon and claims the benefit of priority from United Kingdom patent application No. 1709679.3, filed on Jun. 16, 2017, the disclosure of which is incorporated herein in its entirety by reference.

The invention claimed is:

1. A method performed by a radio access network (RAN) node, the method comprising:
  transmitting, on a physical broadcast channel (PBCH), a first part of minimum system information including first information identifying a first bandwidth; and
  transmitting a second part of the minimum system information using the first bandwidth, wherein
  the second part of the minimum system information includes:
    second information for indicating a system bandwidth for a bandwidth part; and
    third information identifying an offset based on a location of the PBCH to a first resource block of the system bandwidth.

2. A method performed by a user equipment (UE), the method comprising:
  receiving, on a physical broadcast channel (PBCH), a first part of minimum system information including first information identifying a first bandwidth; and
  receiving a second part of the minimum system information using the first bandwidth, wherein
  the second part of the minimum system information includes:
    second information for indicating a system bandwidth for a bandwidth part; and
    third information identifying an offset based on a location of the PBCH to a first resource block of the system bandwidth.

3. The method according to claim 2, wherein the second part of the minimum system information is transmitted on a physical downlink shared channel (PDSCH).

4. The method according to claim 2, wherein the first information indicates a frequency offset based on a resource block for the PBCH.

5. The method according to claim 4, wherein the frequency offset is based on a smallest index of a resource block in frequency, included in the PBCH.

6. A radio access network (RAN) node comprising:
  at least one memory storing instructions; and
  at least one processor configured to process the instructions to:
    transmit, on a physical broadcast channel (PBCH), a first part of minimum system information including first information identifying a first bandwidth; and transmit a second part of the minimum system information using the at least one communication resource, wherein the second part of the minimum system information includes:
second information for indicating a system bandwidth for a bandwidth part; and
third information identifying an offset based on a location of the PBCH to a first resource block of the system bandwidth.

7. A user equipment (UE) comprising:
at least one memory storing instructions; and
at least one processor configured to process the instructions to:
receive, on a physical broadcast channel (PBCH), a first part of minimum system information including first information identifying at least one communication resource; and
receive a second part of the minimum system information using the at least one communication resource, wherein the second part of the minimum system information includes:
second information for indicating a system bandwidth for a bandwidth part; and
third information identifying an offset based on a location of the PBCH to a first resource block of the system bandwidth.

* * * * *